United States Patent [19]

Wolters et al.

[11] 4,069,888
[45] Jan. 24, 1978

[54] TRAFFIC SYSTEM, ESPECIALLY PUBLIC LOCAL PASSENGER TRAFFIC SYSTEM

[75] Inventors: Gerhard Wolters, Gaggenau; Paul Strifler, Dettingen, both of Germany

[73] Assignee: Daimler-Benz Aktiengesellschaft, Germany

[21] Appl. No.: 679,684

[22] Filed: Apr. 23, 1976

[30] Foreign Application Priority Data

Apr. 24, 1975 Germany .............................. 2518120

[51] Int. Cl.² ............................................. B60K 27/00
[52] U.S. Cl. ..................................... 180/98; 318/587; 340/1 R; 340/40; 343/7 VC
[58] Field of Search .......... 180/98; 343/7 VC, 7 VM, 343/7 TA; 340/1 T, 1 R, 40; 318/587, 581

[56] References Cited

U.S. PATENT DOCUMENTS

| | | | |
|---|---|---|---|
| 2,996,137 | 8/1961 | Chu | 180/98 |
| 3,105,953 | 10/1963 | Polster | 340/1 T X |
| 3,138,357 | 6/1964 | Whitwell | 180/98 X |
| 3,172,496 | 3/1965 | Rabinow | 180/98 X |
| 3,559,756 | 2/1971 | Torres | 180/98 |
| 3,606,933 | 9/1971 | Rushing | 180/98 |
| 3,668,624 | 6/1972 | Spaulding | 180/98 X |
| 3,669,205 | 6/1972 | Brooke | 180/98 |
| 3,941,201 | 3/1976 | Hermann | 180/98 |

FOREIGN PATENT DOCUMENTS

| | | | |
|---|---|---|---|
| 1,157,550 | 2/1959 | France | 180/131 |
| 1,802,836 | 6/1970 | Germany | 180/98 |
| 1,293,881 | 10/1972 | United Kingdom | 343/7 VC |
| 819,249 | 9/1959 | United Kingdom | 180/98 |

*Primary Examiner*—Joseph F. Peters, Jr.
*Assistant Examiner*—John P. Silverstrim
*Attorney, Agent, or Firm*—Craig & Antonelli

[57] ABSTRACT

A traffic system, especially a public local passenger traffic system, with self-propelled trackless steerable vehicles travelling on special lanes. Beam reflectors, especially sound reflectors are arranged along the entire length of the lane true to the shape of the road transmitting and receiving apparatus, especially sound echo sounding or radar apparatus, are provided in each vehicle which influence the vehicle steering system to provide an automatic vehicle cross guidance in accordance with the contact-free distance detection of the reflectors.

18 Claims, 8 Drawing Figures

TRAFFIC SYSTEM, ESPECIALLY PUBLIC LOCAL PASSENGER TRAFFIC SYSTEM

The present invention relates to a traffic system, especially to a public passenger local traffic system, with self-propelled, trackless steerable land or road vehicles, as well as with line-shaped road bodies provided with a separate lane per driving direction.

In the strongly crowded road traffic of the large cities and in the congestion areas, separate lines or lanes closed off for the individual traffic are increasingly made available for the trackless public local passenger traffic in order that the vehicles of the public passenger local traffic are able to maintain a schedule notwithstanding a high traffic occurrence and are far-reachingly relieved of traffic loads and jam-ups of the remaining traffic. These separate travel lanes are either branched off from the traffic space available to the individual traffic or they must be displaced onto elevated roads or underground. In every case, for cost or for space reasons, one lane per driving direction which is as narrow as possible, is desirable in the center area of the concentration or high density space where separate lanes for the bus traffic or the like are provided. A narrow lane, however, is very dangerous for a fast drive with a manually steered vehicle and is therefore not acceptable. On the other hand, vehicles with positive guidance both on the side of the vehicle as also on the side of the road body are costly in purchase and maintenance in comparison to normal line buses. Therebeyond, with many different types of positively guided vehicles, by reason of a one-sided construction of the vehicles to that effect, the vehicles with the positive guidance would also have to be positively guided in those traffic areas in which a separate lane could be dispensed with for reasons of a lesser traffic incidence per unit area. Consequently, an unnecessary large amount of money will be spent for the road bodies of positively guided traffic systems in the outer areas of high-density spaces.

It is the aim of the present invention to indicate a traffic system which differs only insignificantly from existing traffic systems as regards costs, both on the side of the vehicle as also on the side of the road, but which combines in itself the advantages of the separate, yet space-saving lanes in dense traffic areas and of the mixed traffic in thinned out edge areas, i.e., which is convertible without difficulty and at any time between the two traffic systems.

The underlying problems are solved according to the present invention in that radiation reflectors, especially sound reflectors which accurately follow the road configuration, are provided along the entire length of the road body, and in that beam transmitters and reflection receivers (echo-sounding or radar apparatus), especially sound-echo-sounding or radar apparatus which influence the vehicle steering system, are arranged at each vehicle for the contact-free distance-determining detection of the reflectors to thereby provide an automatic vehicle cross-guidance.

The automatic cross guidance of the vehicle is therefore effected by a contact-free, i.e., force-free lateral detection or sensing of a guideline. Consequently, this guideline need not be particularly stable and can therefore be very inexpensive. Since for safety reasons as a rule guide structures or guide plankings, for example, in the form of posts, boards or guide planks, etc. is anyhow required adjacent the road bodies, the same may serve as guideline and as reflector. The present invention contemplates in the first instance the use of ultra-sound radiation for the detection or sensing, however, other types of radiation such as optical and electromagnetic beams are also possible for purposes of the present invention. Ultrasound echo-sounding or radar apparatus and receiver apparatus detecting short periods of time as well as the electronic building blocks for the processing of these operating data have undergone a high degree of development and can be taken over in the present invention as completely developed, commercially available components. Since modern buses frequently include anyhow a hydraulic servo-steering system, it is possible without difficulty to influence with the aid of the hydraulic steering system as well as with a customary converting system for converting electrical into hydraulic magnitudes, also of conventional, known construction, the vehicle steering system by the echo-sounding or radar apparatus and by the evaluation unit thereof.

In order to be able to detect influences of the steering system on the lateral distance of the vehicle from the reflectors as rapidly as possible and sufficiently early after a steering inter-engagement, provision is made according to the present invention that the echo-sounding or radar apparatus are arranged at least within the area of the vehicle end of the steerable wheels. In order to be able to detect not only the lateral distance of the vehicle from the reflectors but also the direction of the vehicle relative to the same, it is appropriate if echo-sounding or radar apparatus are arranged within the area of both ends of the vehicle. An arrangement of echo-sounding or radar apparatus on both ends, i.e., forwardly and rearwardly at the vehicle is also of advantage with an automatic transverse guidance of the vehicle when driving backwards.

In order to keep away influences of the inherent dynamics of the vehicle, especially in order to keep away movements of the body about the tilting or roll axis of the vehicle from the steering system, it is appropriate if the reflectors are arranged along the road at least approximately tangentially to a circular arc about the lateral tilting or roll axis of a vehicle travelling in the center of the road as center point of the circular arc and if the echo-sounding or radar apparatus with their transmitting and receiving installation are arranged at the vehicle radially to the lateral tilting or roll axis and directed toward the reflectors. With such an arrangement of the reflectors and of the echo-sounding or radar apparatus, no positional changes in the lateral direction of the road are simulated with any possible lateral tilting movements of the vehicle body by reason of lateral forces or one-sided surface unevenesses and accordingly, also no steering deflections are initiated—with correct transverse position of the vehicle.

It is appropriate if reflectors are arranged on one side adjacent the road (side reflectors) at least within the normal line guidance area and if echo-sounding or radar apparatus are arranged laterally at the vehicle (lateral transverse guidance). With this construction, the reflectors and echo-sounding or radar apparatus are arranged in proximity of the ground in a manner favorable from a cost- and servicing point of view.

With the lateral transverse guidance near the ground, it is particularly favorable if the reflectors are arranged vertically at the road edge and the echo-sounding or radar apparatus with their transmitter and receiver devices are arranged horizontally extending laterally at the vehicle, preferably at the height of the lateral tilting or roll axis of the vehicle. In addition to the lateral tilting movements of the vehicle bodies, also pitching (nose-diving) movements can be kept out of the vehicle steering system by the vertical and horizontal orientation of the reflectors and echo-sounding or radar apparatus, respectively. As to the rest, different loads of the vehicle cannot lead to distance changes with the automatic vehicle transverse guidance.

Separate lanes for buses or the like must for safety reasons frequently be provided with a guide structure, for example, in the form of upright lane dividers, etc. For the purposes of the present invention, it is therefore advantageous to provide along the road edge within the entire area of the separate road body at least on one side a mechanical guide structure arranged preferably at the height of the lateral tilting or roll axis of the vehicle and to utilize these guide structures as reflectors. In order that—as is frequently the case—the separate road bodies (lanes) can also be utilized by police or emergency ambulance vehicles and by taxis without visibility impairment, it is appropriate to dimension the upper edge of the guide structures at most only insignificantly higher than the customary height of the lower window edge of normal passenger motor vehicles. The aforementioned authorized passenger motor vehicles may travel along the separate road bodies also with high velocity and with manual vehicle steering by reason of their lesser width and therefore do not need an automatic vehicle transverse guidance.

In order to be able to steer the vehicles safely by the automatic transverse guidance within the area of road crossings, bifurcations or mergers, including access roads, it is advantageous if at least within these areas reflectors are arranged on both sides adjacent each road lane. Vehicles which are to be used in a road network with road crossings, bifurcations and mergers at the same level, must then include echo-sounding or radar apparatus on both sides of the vehicle.

At bifurcations and road mergers one uninterrupted reflector structure is present at each lane with an arrangement of reflectors on both sides whereas at the respective other road side, namely, at the respectively mutually facing road sides, the reflectors must necessarily be interrupted also with an arrangement on both sides. In order to render the automatic vehicle cross guidance operationally reliable also at such places of interruption of the reflectors, provision may be made that a selectively actuatable means for shifting or switching-over from a lateral transverse guidance by the echo-sounding or radar apparatus on one vehicle side or by the echo-sounding or radar apparatus on the two vehicle sides to a lateral transverse guidance by the echo-sounding or radar apparatus only of the other vehicle side is provided in the vehicle. This shifting or switching may take place by a switch manually actuatable by an operating person, for example, in the manner of a directional indicator switch. However, the described shifting or switching may also take place automatically by a road influencing means. This would still further relieve the operating person and would give to such person the possibility to hand out during the drive—while seated at the operating place—tickets to passengers who have boarded the public transportation vehicle. As a result thereof, the network traffic could be accelerated. At road mergers, this automatic switching of the automatic vehicle transverse guidance to a one-sided transverse guidance could take place in that pulse transmitters are arranged at least ahead of a road merger, as viewed in the driving direction, at the edges of both merging road lanes, and in that sensors or receivers responding to the pulse transmitters are arranged in or at the vehicle which act on the switching means in such a manner that at least during the period of time of the passage through the merger place, only that echo-sounding or radar apparatus remains effective which is coordinated to the continuous reflector structure at the merger place. The automatic vehicle cross guidance, with a passing vehicle, is transferred unilaterally to the side of the continuous guide structure by the pulse transmitter arranged at the road edge ahead of the road merger, for example, arranged on the side of the continuous guide structure. Since the driving direction or the driving destination of the vehicles driving through a merger place is determined in each case beforehand, a road-influenced switching of the automatic cross guidance is relatively simple in that case. It becomes more difficult with a road bifurcation in which the driving direction or the driving destination of the individual passing vehicles is not predetermined beforehand. Provision is appropriately made in that case that at least one pulse transmitter arranged at the road edge is provided at least ahead of such a bifurcation in the driving direction and a sensor or receiver responding to the pulse transmitter is arranged in or at the vehicle which effects the switching, whereby the pulse transmitter is activated by a pre-programmed signal emitted by the vehicle and specifying the course of the vehicle.

At level road crossings, i.e., at crossings at the same level, it is not possible to let a side reflector continue uninterruptedly at least on one side within the immediate cross-over area. It is therefore appropriate to arrange within the area of road crossings, reflectors above the vehicle along the road course (overhead reflectors) and echo-sounding or radar apparatus in the roof area at the vehicle (roof transverse guidance). For purposes of avoiding a projection of the echo-sounding or radar apparatus at the vehicle outer contour, it is advantageous if the reflectors are arranged inclined to the gravitational direction and if the echo-sounding or radar apparatus with their transmitting and receiving device are arranged disposed at least approximately at right angle to the reflectors laterally in the roof area of the vehicle with an at most insignificant projection beyond the normal vehicle contour. The reflectors and echo-sounding or radar apparatus for the roof cross guidance can be arranged at least approximately symmetrically to the road center and vehicle center. For relieving the driver provision may be made that within the area of the road crossings, both side reflectors as also overhead reflectors are arranged along the mutually crossing road lanes and that corresponding echo-sounding or radar apparatus are arranged at the vehicle both for a lateral as well as for a roof transverse guidance and that furthermore pulse transmitters are arranged at least ahead of a road crossing, as viewed in the driving direction but inside of the area of the overhead reflectors at the edges of both mutually crossing road lanes and sensors or receivers responding to the pulse transmitters are arranged in or at the vehicle which automatically switch the automatic vehicle transverse guidance from the lateral transverse guidance to the roof transverse guidance at least during the traversal through the crossing area.

The roof transverse guidance not only presupposes costly overhead reflectors requiring maintenance according to the experience with electric overhead lines but also an additional shiftable echo-sounding or radar system in the roof area of the vehicle. For purposes of avoiding this expenditure required exclusively within the area of level road crossings, provision may also be made that within the area of road crossings, movable side reflectors are arranged at least on one road side which depending on the use-direction of the road crossing can be selectively displaced into alignment with the reflectors of the one or of the other mutually crossing roads. Many types of movability are thereby feasible within the scope of the present invention, for example, reflectors adapted to be lowered from above or reflectors arranged recessed in the grounds and adapted to be raised or reflectors adapted to be pivoted open and closed according to the type of railroad crossing gates. A reflector pivotal in a horizontal plane about a vertical axis arranged in the crossing corner requires a very low expenditure, which—similar to a pivotal gate—can be selectively pivoted into the alignment with a row of side reflectors of the one road lane or with the reflector row of the other lane. The movement of the movable part of the side reflector into alignment with the row of the fixed side reflectors can take place automatically by a road influencing means, for example, by driving over a road switch (treadle) and/or by driving through a light barrier or the like (photo-electric gate).

As already mentioned, the operating data determined by the echo-sounding or radar apparatus are processed in an electronic unit of conventional type, utilizing conventional, commercially available logic elements. This electronic unit operates appropriately in the following manner, utilizing commercially available logic circuits and components: The echo-time periods determined by the echo-sounding or radar apparatus, i.e., the time periods elapsed between the transmission and reception of the reflected signals are compared with a fixed value of a time interval (fixed period of time) selectable at will and lying approximately within the range of the usual echo periods, and depending on the magnitude and sign of the difference between the echo time and the fixed time, the vehicle steering system is automatically influenced by conventional means in that direction which brings the difference back to zero (one-sided transverse guidance). With this manner of operation, one is able to get along with a reflector structure on only one side of the lane, thereby involving lower investment costs, as may be expected in a first development stage of a corresponding traffic system and as may be encountered in the operation within the area of crossings, bifurcations or road mergers. The response sensitivity of the automatic transverse guidance, however, can be considerably increased if reflectors and echo-sounding or radar apparatus are arranged symmetrically on both sides of the road and of the vehicle and if the echo periods of time of the one vehicle side are compared with those of the other side and if, depending on the magnitude and sign of the difference of the two echo time periods, the vehicle steering system is influenced in that direction which brings the difference back to zero (opposite transverse guidance). As a result of the time comparison of the two echos with each other, the time difference with the use of an opposite transverse guidance becomes with a predetermined center deviation of the vehicle twice as large as the determined time difference with the use of the one-sided transverse guidance. Consequently, one will aim at an opposite transverse guidance as the final development stage of the traffic system in accordance with the present invention. Nonetheless—as already mentioned—the one-sided transverse guidance becomes indispensible by reason of the crossings, bifurcations and road mergers. For that reason, preferably both systems are provided in the vehicle with the final development stage and means are provided so that one is able to switch from the one (one-sided cross guidance) to the other type of operation (opposite cross guidance) and vice versa. This switching-over can take place manually at will by the driver in the manner of a directional turn indicator switch or for purposes of relieving the driver, also automatically by a road influencing means or also autonomously by the vehicle itself. The latter possibility saves corresponding pulse transmitters to be installed at the road edge. An autonomous switching system from the one-sided transverse guidance to the opposite transverse guidance and vice versa can take place in that with the opposite transverse guidance, in addition to a time comparison of the two echo periods of time with each other, additionally also a time comparison of the echo periods of time of each vehicle side with a fixed value of a time interval which is considerably greater than the normal echo period, preferably twice as long (maximum period) is carried out and in that as long as the echo periods of time of both sides are shorter than the maximum time, the opposite transverse guidance is preserved but that as soon as an echo cannot be determined on on vehicle side within the maximum time, i.e., if the maximum period of time is exceeded on one side, the vehicle operation is switched over to a one-sided transverse guidance, and more particularly to that vehicle side, on which the echos still fall within the maximum period of time. This autonomous switching over is effective not only within crossing- or bifurcation- and merger-areas but also responds if, for example, for service or repair purposes, the reflectors are disassembled or removed on one side within given sections. The autonomous switching over may also be utilized according to a further development for warning the driver when leaving the separate road body, i.e., the reserved lane. For that purpose, provision may then be made that an optical and/or acoustic signal is produced by conventional means at the operating (drive) station of the vehicle when the maximum period of time is exceeded on both sides of the vehicle. Again, conventional electronic circuits and components, known as such in the prior art, may be used for that purpose.

For purposes of avoiding an environmental annoyance as regards noise, provision is made appropriately that ultrasonics are used as type of radiation. This type of radiation has the advantage compared to light and electromagnetic or heat radiation of a longer and therefore more reliably detectable travel time and, unlike for example, with light rays, is not tied to mirror-smooth and clean reflector surfaces. On the other hand, the light which expands rectilinearly would have the advantage that a contact-free distance-determining sensing or detection by inclined reflection and a sensing or detection of the impact place of the reflection beam which is quite sturdy and simple from an apparatus point of view, would be possible. In order to permit the creation of a sound impression by an excessively high pulse repetition rate or pulse sequence notwithstanding the use of ultrasonics, provision is made that the pulse repetition rate of the sound pulses is smaller than about 16 per second. This means, for example, for a vehicle velocity of 60 km/h, a driving distance of 1 m per pulse, which should be absolutely sufficient with the large vehicle length. A sound-pressure repetition rate of fewer than 16 per second cannot yet be perceived as tone by the human ear, i.e., lies below the audible range, in the so-called infra-sound range. In order to keep the sound pressure changes as small as possible on the average per time and therewith to keep as small as possible as regards its intensity a noise impression which may nonetheless occur, for example, by reason of harmonics or the like, provision may be made that the keying ratio of the sound pulses lies as close to zero as possible. In that connection, one understands by the term "keying ratio" of the sound pulses the ratio of the time duration of a pulse to the time distance of the beginning of two successive pulses. With a keying ratio near zero, the pulses are very short and the echo of the pulse itself is registered. A very small keying ratio also results already from the requirement that on the one hand th pulse sequence should lie with certainty in the infrasound range—which results in a relatively large time spacing of the pulses—but that on the other hand, the pulse duration should be unequivocally smaller than the smallest possible echo period—which results in very short pulses.

Accordingly, it is an object of the present invention to provide a traffic system, especially a public passenger local traffic system which avoids by simple means the aforementioned shortcomings and drawbacks encountered in the prior art.

Another object of the present invention resides in a traffic system, especially in a public passenger local traffic system, which is simple in construction, involves relatively low cost and assures great reliability in operation.

A further object of the present invention resides in a public passenger traffic system of the type described above which permits the assignment of relatively narrow road lanes for the scheduled public local passenger traffic, for example, by buses, yet permits rapid travel and high degree of safety without danger of accidents.

A still further object of the present invention resides in a public local passenger traffic system which provides an automatic guide system within high density traffic areas where special lanes are assigned to public transportation, yet eliminates the need of specially assigned lanes in those areas where the density of traffic is smaller.

Still another object of the present invention resides in a traffic system which differs as regards costs only insignificantly from existing traffic systems yet combines the feature of separate and space-saving road lanes in high density traffic areas and of mixed traffic in thinner edge areas of the traffic.

Another object of the present invention resides in a traffic system of the type described above which can be readily converted, even automatically, from an automatic traffic system utilizing assigned public transportation lanes to normal traffic systems with non-assigned lanes.

A further object of the present invention resides in a public local passenger traffic system which acts as rapidly and as early as possible on the steering system of the vehicle as a result of deviations from the center of the assigned lane, yet is relatively insensitive to rolling movements and even pitching movements or nose-dive movements of the vehicle.

A still further object of the present invention resides in a traffic system in which positional changes are not simulated by any possible roll movements of the vehicle body by reason of lateral forces, for example, when in curves, or by reason of one-sided ground unevenesses in the road.

Still another object of the present invention resides in a traffic system which can also be readily used with road crossings, bifurcations or road mergers without loss in the safety of operation.

These and other objects, features, and advantages of the present invention will become more apparent from the following description when taken in connection with the accompanying drawing which shows, for purposes of illustration only, several embodiments in accordance with the present invention, and wherein.

Figure 1:
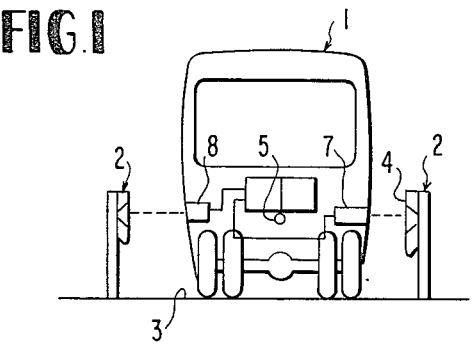
FIG. 1 is a schematic end elevational view of an automatic vehicle transverse guide system in accordance with the present invention, as viewed in the driving direction.
Figure 2:
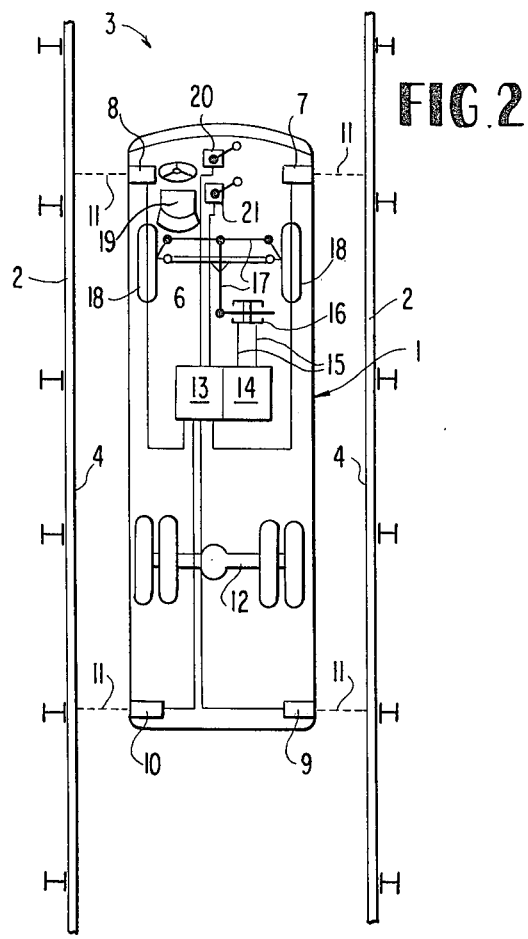
FIG. 2 is a top plan view of the automatic vehicle transverse guide system illustrated in FIG. 1.

Referring now to the drawing wherein like reference numerals are used throughout the various views to designate like parts, a conventional bus generally designated by reference numeral 1 for line or network traffic is illustrated in FIG. 1 and 2 in rear elevation and top plan view, respectively, which travels on a separate lane 3, i.e., separated from the other individual traffic, whereby the lane 3 is adapted to be travelled only in one direction and is secured laterally on both sides by guide members generally designated by reference numeral 2 which, for example, may be in the form of lane dividers, boards, short posts, etc. The guide members 2 are constructed smooth and non-absorbing on the side thereof facing the bus 1 and serve with that side as reflectors 4 for an echo-sounding or radar apparatus arranged in the bus 1. The reflectors 4 are arranged vertically approximately at the height of the lateral tilting or roll axis 5 of the bus 1 so that they extend approximately tangentially to a circular arc about this axis as center point.

Ultrasonic echo-sounding or radar apparatus 7, 8, 9 and 10 of conventional construction are arranged in the bus 1 both in the forward end area in proximity of the steered axle 6 as also in the rear end area in proximity of the non-steered axle 12 and more particularly on both sides thereof. The echo-sounding or radar apparatus 7, 8, 9 and 10 are so arranged—apart from the placing thereof in the vehicle as already described—that the transmitting and receiving direction of the pulse 11 is directed at least approximately at right angle to the reflectors 4.

An electrical and/or electronic control unit 13 of conventional construction and utilizing commercially available logic circuits is coordinated to the echo-sounding or radar apparatus to which are fed the outputs of the echo-sounding or radar apparatus. The control unit 13, in its turn, is coupled with a hydraulic servo-unit 14 of conventional construction which acts hydraulically upon a servo-piston 16 by way of line connections 15 whereby the position of the steered wheels 18 can be influenced by way of the steering linkage 17.

Two switches, namely a directional turn indicator switch 20 for turning right or left and a parking switch 21 for driving forward or driving backward are arranged within the area of the driver seat 19. The echo-sounding or radar apparatus of one end area, for example, when driving forward the rear echo-sounding apparatus 9 and 10, can be selectively turned off by means of the parking switch 21. The echo-sounding or radar apparatusof one vehicle side can be turned off by means of the directional indicator switch 20. Both switches 20 and 21 have a neutral position in which both the forward as well as the rearward and the left as well as the right echo-sounding or radar apparatus are effectively interconnected into the system.

The echo-sounding or radar apparatus detect the lateral distance of the bus 1 to the guide members 2 by way of the echo-time, i.e., by determining the period of time elapsed between the emission and reflection of a pulse. Depending on the extent of the deviation of this echo-time from another time value in the upward or downward direction, the steering is influenced in the direction toward a left or right deflection of the wheels 18.

With the contact-free distance-determining detection of the guide members 2, a two-sided detection and therewith an opposite transverse guidance is possible or a one-sided detection and a one-sided transverse guidance and more particularly a left or right cross guidance is possible. With the opposite transverse guidance, in which the sound pulses are radiated toward the right and left, and more particularly simultaneously by the use of a conventional synchronizing pulse or signal, a comparison of the echo periods of time of the one side with respect to those of the other side is carried out by conventional electronic circuits. With a simultaneous emission of the two sound pulses, consequently one only would have to determine whether and possibly on which side an echo arrives earlier than the other. The side where the echo arrives earlier, indicates that the vehicle approaches the corresponding guide member structure. When exceeding a maximum permissive time difference between the arrival of the two echos, a corresponding interengagement by way of the servo-unit into the steering system of the vehicle would than have to take place which brings the vehicle back again to the road center. The vehicle is held in the road center by the opposite vehicle across guidance. This type of the automatic vehicle transverse guidance presupposes a guide structure on both vehicle sides; however, with this type of automatic vehicle cross guidance the distances can be determined very accurately since a center deviation of the vehicle correspondingly doubles the opposite time interval differences of the echos. As to the rest, any sudden local temperature fluctuations and correspondingly sudden local changes of the sound velocity, for example, when driving through a shaded underpass, are automatically compensated for by the opposite transverse guidance. The sound velocity changes by about 1% with a change of the air temperature by 5.3° C., which means, with a temperature change between two sound pulses of about 11° C a changed echo time period changed by about 2° would establish itself. However, with an opposite vehicle cross guidance, the bus is held on the road center also when passing through strong local temperature fluctuations; one may thereby depart with the fact in general only considerably smaller temperature differences exist over the road width than in the road longitudinal direction.

With a development stage that has not yet progressed fully or within areas of crossings, bifurcations or mergers or also during service or repair works at guide members, exclusively a one-sided vehicle cross guidance is applicable—at least section-wise—by reason of the absence of a continuous reflector guide structure or the like at one of the two lane edges. In that case the echo time is compared and registered with a fixedly adjusted time value or time interval to determine whether or not the echo has arrived at the receiver prior or subsequent to the lapse of the time interval. Depending on the result of the time comparison and accordingly depending on deviation of the vehicle from its intended transverse position on the road lane, the steering is influenced by conventional means whereby the deviated vehicle is again guided back to the correct transverse position so that the echo time and fixed time interval again coincide.

Figure 3:
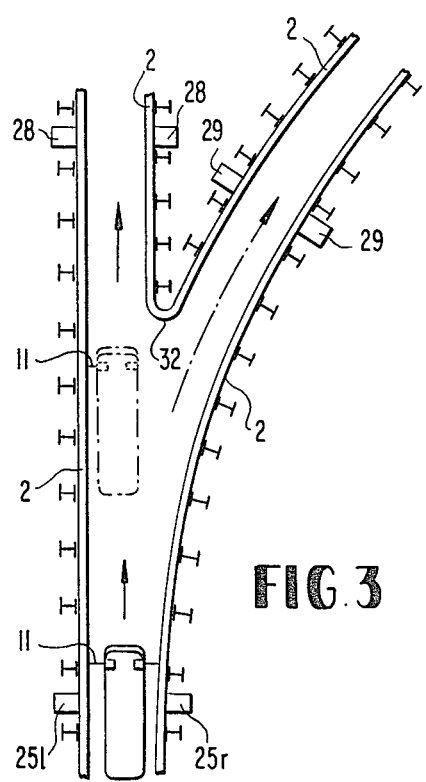
FIG. 3 is a schematic plan view of the automatic vehicle transverse guide system in accordance with the present invention for a road bifurcation with an automatic road influencing means for given driving direction.
Figure 4:
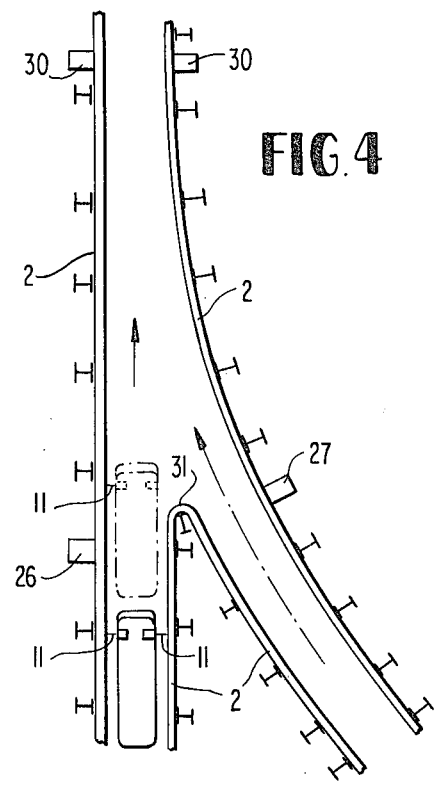
FIG. 4 is a schematic top plan view of an automatic vehicle transverse guide system in accordance with the present invention for a road merger with road influencing means of the automatic vehicle transverse guide system.

As already mentioned, it is possible to switch over by the driver by the use of the directional turn indicator switch 20 from the opposite transverse guidance to the one-sided transverse guidance, and more particularly selectively either to the right or left. This means that the driver has to observe and follow continuously the guide structure to ascertain whether and possibly on which road side an interruption in the guide structure exists. In a modification illustrated in FIG. 3, for example, with a straight drive, the left guide structure is continuous (uninterrupted) and the driver would have to shift in this case the directional switch 20 to "left" prior to entry into the area of the bifurcation delimited on the inlet side by installations 25 *l* and 25 *r* to be described more fully hereinafter; the transmitter pulses 11 are then emitted only on one side. With a road access or merger illustrated in FIG. 4, the driver of the bus illustrated in this figure would also have to shift to "left" prior to entry into the merger area (installations 26 and 27). When leaving the area of the bifurcation (FIG. 3), marked by the installations 28 and 29, the driver should again shift over to opposite vehicle cross guidance as is also the case when leaving the area of the merger delimited by the installation 30 (FIG. 4).

For purposes of relieving the driver from observing the guide structure, also a directional automatic system may be provided by the use again of conventional commercially available means, which operates in the following manner: When driving into the area of a road merger (FIG. 4), a shifting over from the opposite vehicle transverse guidance to the one-sided vehicle transverse guidance is effected by the installations 26 and 27 arranged on the entry or inlet side at the respective continuous guide structure, due to the transmitted pulses emitted from these installations and due to a corresponding sensor or receiver provided at the bus which upon receipt of the pulses emitted by the installation 26 or 27 cause a switch-over from opposite to one-side transverse guidance. When leaving the area of the road merger (FIG. 4), a switching over to opposite transverse guidance takes place by the installations 30 arranged in that case on both sides which also emit a transmitter pulse that is received by a corresponding sensor or receiver in the bus which produces the switching over control. This automatic road-influenced switching over of the transverse guidance from opposite to one-sided transverse guidance and vice versa would presuppose numerous installations 26, 27 and 30 at the individual bifurcations which would not be inexpensive in acquisition and in their constant servicing.

A further possibility in the switching-over from opposite to one-sided cross guidance resides in that not only the distance but also the fact of the existence of a guide structure adjacent the vehicle is detected or sensed by the echo-sounding or radar apparatus. This can be realized by a corresponding construction of the electronic control unit in such a manner that in addition to the mutual time comparison of the echo periods right and left or to a time comparison with a fixedly adjusted time interval (control time), also a time comparison with a further fixed time interval (maximum time) is additionally carried out, which maximum time is approximately more than twice as large as the control time corresponding to the echo time of a bus placed extremely on one side of the lane. The control unit is then so constructed by conventional means that echos which arrive outside of the maximum period of time, remain without consideration and are considered again only when the echo time periods lie within the range of the control time. With such a construction, the switching over from the previously opposite vehicle cross guidance to a one-sided vehicle cross guidance is carried out when the bus passes the spur 31 (FIG. 4) at the road merger whereby suddenly a guide structure is missing on one side. The echo time exceeds suddenly on one side the maximum time and the echos of this side remain non-considered; by reason of a priority circuit of conventional construction, a time comparison with the fixedly adjusted control time interval is now carried out continuously by means of the echo-sounding or radar apparatus on the opposite side. The priority circuit may be reversed when the temporarily non-considered echo times approach—suddenly or gradually—the control time in such a manner that now the time comparison of the two echo times with one another has priority compared to a time comparison of one of the echo times with the fixed time interval. An autonomous switching-over which is independent of a road influencing means, from the opposite to the one-sided cross guidance may be realized by this construction of the electronic control unit.

The change-over of the different time comparisons—opposite time comparison of the two echos or one-sided time comparison of one of the two echos with a fixed time interval—can take place by a conventional, correspondingly influenced priority circuit—as already mentioned—manually by a switch, by road influencing means or also by a time comparison of the echos with a maximum time.

The autonomous switching-over of the automatic cross guidance from opposite to one-sided vehicle cross guidance is not realizable without difficulty in case of a road bifurcation because a direction into which the bus is to turn, must be prescribed or preset for the bus. However, the bus may carry with it this information, for example, in the form of the ultrasonic frequency, with which it emits its sound pulses. The installations 25 *l* and 25 *r* (FIG. 3) installed at the inlet on both sides at the road bifurcation may be so constructed that they respond selectively only to predetermined previously adjusted sound frequencies and in their turn—upon responding—transmit a pulse in the direction toward the vehicle which is received thereat by a corresponding sensor or receiver whereby again a switching over of the automatic transverse guidance from opposite to one-sided transverse guidance is undertaken. The switching back from one-sided to opposite transverse guidance can again take place autonomously when passing the spur 32 (FIG. 3). The sound frequencies of all of those buses are adjusted in the installation 25 *l* which detect at this road bifurcation the left guide structure and are intended to drive straight; other frequencies and more particularly the sound frequencies of all of those vehicles are adjusted at the opposite installation 25 *r* which are intended to turn right at this bifurcation.

Figure 5:
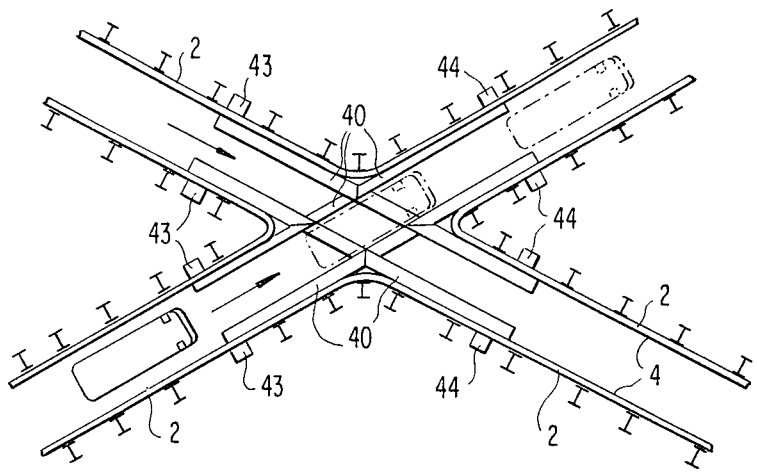
FIG. 5 is a schematic top plan view of an automatic vehicle transverse guide system for a road crossing with a roof transverse guide system in accordance with the present invention within the cross-over area.
Figure 6:
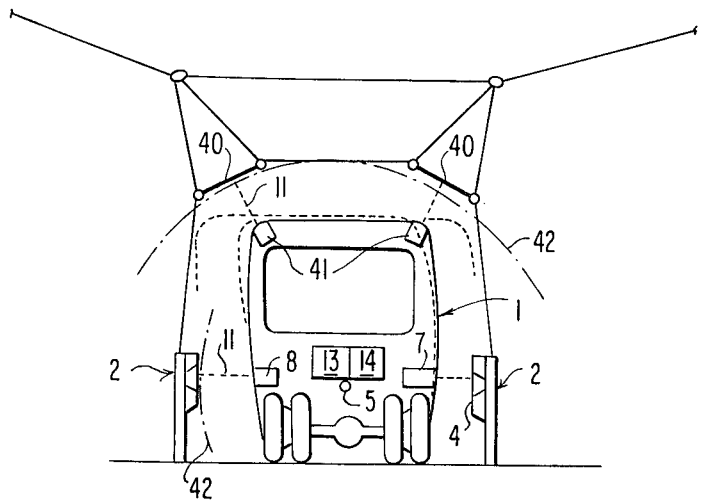
FIG. 6 is a schematic end elevational view of one embodiment of the arrangement of the overhead reflectors above the road as well as of the corresponding coordination of the roof echo-sounding or radar apparatus in a traffic system according to the present invention.

In the crossing area, guide structures are not possible section-wise either on the one or on the other side of the lane. For that reason, the embodiment of a road crossing according to FIGS. 5 and 6 provides sound reflectors 40 above the lane and the vehicles as well as corresponding echo-sounding or radar apparatus 41 arranged in the vehicle roof area. The overhead reflectors 40 and the roof echo-sounding or radar apparatus 41 are directed toward the roll axis 5 of the vehicle, i.e., the reflectors 40 are tangential to a circular arc 42 with the center of the circle within the area of the roll axis 5 of a vehicle arranged in the center of the lane and the echo-sounding or radar apparatus 41 are arranged with their transmitter and receiver devices in the vehicle roof area radially to the roll center 5 and toward the reflectors 40. Since the lateral deviation in the roof area is normally very large as a result of a rolling movement of the vehicle (as indicated by the dash and dotted vehicle contour)—the roll axis lies normally very low—it is important that the roll movements have as small as possible a feedback on the position determination of the vehicle. The overhead reflectors 40 are suspended at overhead wires above the crossing area symmetrically to the lane center outside of the drive profile of the vehicle and so high that the vehicle can pass underneath the same. The roof echo-sounding or radar apparatus 41 are connected in parallel with the lateral echo-sounding or radar apparatus 7 – 10, and when driving into an area of the overhead reflectors 40, an opposite transverse guidance is taken over by the overhead reflectors 40 so that the vehicle is guided over the crossing with the aid thereof and with the aid of the automatic transverse guide system.

Figure 7:
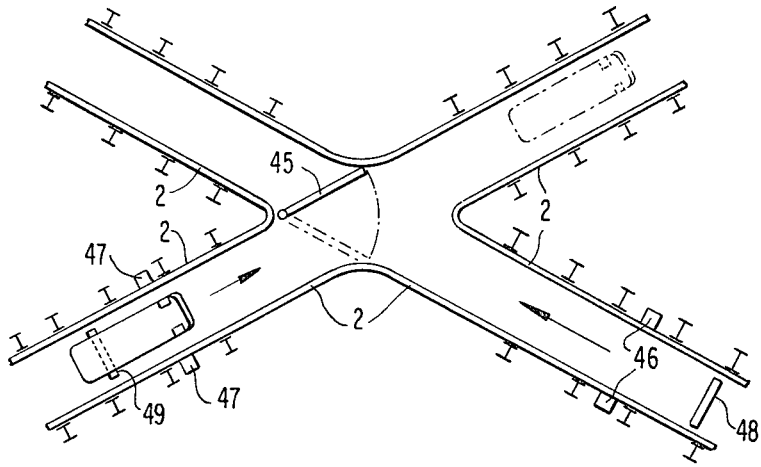
FIG. 7 is a schematic top plan view of an automatic vehicle transverse guide system for a road crossing with a movable side reflector in the cross-over area in accordance with the present invention.

The overhead reflectors and the roof echo-sounding or radar apparatus may also be dispensed with in another embodiment of the traffic system as illustrated in FIG. 7. In this embodiment, a movable partial member 45 of a guide structure is provided which, depending on use of the crossing, is pivoted into alignment with the row of one of the lateral guide members. The guide structure partial member movable in the manner of a pivotal gate is provided within the hinge area with its own service-free sturdy drive. The pivoting may be automatically triggered by an approaching vehicle by means of light barriers 46 and 47 (photoelectric gates) arranged ahead of the crossing, as viewed in the driving direction, and/or by road treadles or switches 48 and 49. The movement and control of the guide structure partial member 45 can be combined with an automatic light signal installation of conventional type. This type of the automatic transverse guidance would have the disadvantage that a movable reflector with a vehicle influenced control system would have to be provided at each crossing but offers the advantage compared to the embodiment according to FIGS. 5 and 6 that a uniform lateral transverse guidance could be used under all operating conditions and that the expenditures for the overhead reflectors which require servicing, are relatively costly and disturb the city appearance, together with the roof echo-sounding or radar apparatus can be dispensed with in all vehicles.

Figure 8:
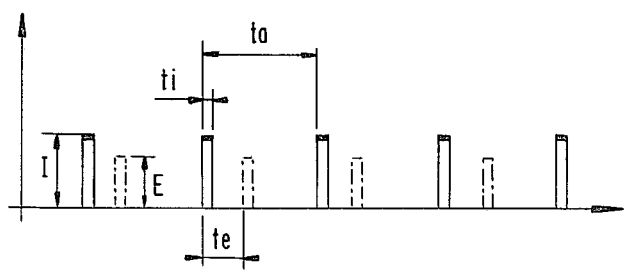
FIG. 8 is a schematic time diagram of the pulse sequence for the ultasound echo-sounding or radar apparatus in accordance with the present invention.

The pulse sequence for the sound pulses is schematically illustrated in the time diagram of FIG. 8. Short sound pulses, i.e., sounds in the ultrasonic range with the pulse duration $t_i$ and the pulse amplitude I are continuously emitted with a time or pulse spacing $t_a$. The keying ratio is the ratio $t_i/t_a$ and should be very small. After a short period of time, i.e., after the echo time $t_e$, the sound echo of the sound pulse arrives with the lower intensity E.

In order that a noticeable sound impression does not possibly occur as a result of the pulse sequence or repetition rate, it is advisable to select for the pulse frequency such a pulse repetition rate as lies in the infrasound range. With a pulse sequence or repetition rate of 16 per second and with a driving velocity of 60 km/h, this would mean a local pulse spacing of about 1 m. With a lateral distance of the guide members 2 from the echo-sounding or radar apparatus of 30 cm, the echo time amounts to 1.8 ms. In order to be able to detect safely also distances within the range of 3 cms, i.e., echo periods of 0.18 ms, the pulse duration must be still shorter in order that the pulse and the echo do not overlap timewise, i.e., for example, a pulse duration of 0.1 ms. With an ultrasonic frequency of 50 kHz, this would correspond to a pulse duration of about 5 sound oscillations. On the basis of these figures, the keying ratio of the pulse $t_i$ to $t_a$ would amount to approximately $1.6 \times 10^{-3}$.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A traffic system comprising:
   a roadway including at least one separate, single lane;
   a land vehicle for moving along said lane and having a central longitudinal vertical plane;
   steerable wheels on said vehicle;
   means for actuating said steerable wheels;
   energy reflector means mounted along said lane;
   energy-transmitting-and-reflection-receiving means mounted on said vehicle for distance-determining detection of said reflector means;
   means for controlling said steerable wheel actuating means in response to said detection;
   said reflector means including at least one reflector arranged at each side of said lane at least at bifurcations and mergers of said lane;
   said transmitting-receiving means including transmitter-receivers mounted on both sides of said central longitudinal vertical plane of said vehicle; and
   switching means on said vehicle for switching said controlling means from being responsive to said detection of said transmitter-receiver on one side of said plane to be responsive to said detection of said transmitter-receiver on the other side of the plane.

2. A traffic system according to claim 1, wherein said transmitter-receivers are mounted on the roof of the vehicle on opposite sides of said plane and said reflector means includes reflector members mounted along both sides of said lane above the roof of the vehicle.

3. A traffic system according to claim 1, wherein said transmitter-receivers are mounted on the sides of the vehicle on opposite sides of said plane and said reflector means include reflector members along both sides of said lane for cooperation with said side mounted transmitter-receivers.

4. A traffic system according to claim 1, wherein said switching means includes a switch manually actuable by an operating person.

5. A traffic system according to claim 1, wherein said switching means is responsive to a road influencing means for activating said switching means.

6. A traffic system according to claim 5, further comprising pulse transmitter means arranged at least in front of a road merger as viewed in the driving direction at the edges of both merging lanes, and sensor means responsive to said pulse transmitter means being arranged on the vehicle for actuating said switching means so that at least only that transmitting-receiving means remains effective during the period of time of passage through the merger place which is coordinated to an uninterrupted reflector means continuously existing at the merger place.

7. A traffic system according to claim 5, further comprising pulse transmitter means arranged at the road edge at least ahead of a bifurcation as viewed in the driving direction, sensor means responsive to the pulse transmitter means being arranged on the vehicle for controlling the switching means, said pulse transmitter means being activated by a pre-program signal transmitted by the vehicle and specifying the line course of the vehicle.

8. A traffic system according to claim 1, wherein said transmitting-receiving means transmits and receives sound waves, the frequency of the sound waves emitted by the transmitting means being in the ultrasonic range.

9. A traffic system according to claim 1, wherein said reflector means includes at least one continuous, uninterrupted reflector member extending along said lane.

10. A traffic system according to claim 1, wherein said reflector means includes at least one mechanical guide structure provided at the roadway edge.

11. A traffic system according to claim 1, wherein said reflector means includes at least one overhead reflector member arranged above the vehicle along said lane, and said transmitting-receiving means includes at least one transmitter-receiver arranged on the vehicle in the roof area for providing a roof transverse guidance.

12. A traffic system comprising:
a roadway including at least one separate single lane;
a land vehicle for moving along said single lane;
steerable wheels on said vehicle;
means for actuating said steerable wheels;
energy reflector means mounted along said lane;
energy transmitting-and-reflection-receiving means mounted on said vehicle for distance-determining detection of said reflector means;
means for controlling said steerable wheel actuating means in response to said distance-determining detection;
said reflector means including side reflectors mounted below the roof of said vehicle and overhead reflectors mounted above said roof, said overhead reflectors being mounted at least at crossings between two of said lanes;
said transmitter and receiving means including at least one side transmitter-receiver mounted on the side of said vehicle for determining the distance of said side reflectors from said vehicle and at least one roof transmitter-receiver mounted in the area of the roof of said vehicle for determining the lateral distance of said overhead reflectors from said vehicle; and
switching means mounted on said vehicle for switching said control means from being responsive to said distance-determining detection of said side transmitter-receiver to being responsive to said distance-determining detection of said roof transmitter-receiver.

13. A traffic system according to claim 12, further comprising means mounted along said lanes before said crossings, in the driving direction, for actuating said switching means.

14. A traffic system according to claim 12, wherein said lanes have mutual crossings, said reflector means including at least one reflector at at least one side of each of said lanes and at least one movable reflector at at least one of said crossings for selective displacement between alignment with a reflector member of one of said lanes and alignment with a reflector member of the other of said lanes.

15. A traffic system comprising:
a roadway including separate, single lanes having mutual crossings;
a land vehicle for moving along said lanes;
steerable wheels on said vehicle;
means for actuating said steerable wheels;
energy reflector means mounted along said lanes;
energy-transmitting-and-reflection-receiving means mounted on said vehicle for distance-determining detection of said reflector means; and
means for controlling said steerable wheel actuating means in response to said distance-determining detection;
said reflector means including at least one reflector member at at least one side of each of said lanes and at least one movable reflector at at least one of said crossings for selective displacement between alignment with said reflector member of one of the lanes and alignment with the reflector member of the other of said lanes.

16. A traffic system according to claim 15, wherein said at least one reflector member is a continuous, uninterrupted reflector extending along said lane.

17. A traffic system according to claim 15, wherein said at least one reflector member is a row of reflectors.

18. A traffic system according to claim 15, wherein said movable reflector is movable in at least one of a horizontal and vertical plane for alignment with the reflector member at the side of said lanes.

* * * * *